(12) United States Patent
Sutter

(10) Patent No.: US 8,852,479 B2
(45) Date of Patent: Oct. 7, 2014

(54) ESCAPE ROUTE MARKING FOR AN AIRCRAFT AND METHOD FOR PRODUCING AN ESCAPE ROUTE MARKING

(75) Inventor: Wolfgang Sutter, Halstenbek (DE)

(73) Assignee: Lufthansa Technik AG, Hamburg (DE)

( * ) Notice: Subject to any disclaimer, the term of this patent is extended or adjusted under 35 U.S.C. 154(b) by 7 days.

(21) Appl. No.: 13/334,421

(22) Filed: Dec. 22, 2011

(65) Prior Publication Data

US 2012/0091607 A1 Apr. 19, 2012

Related U.S. Application Data

(63) Continuation of application No. 12/919,518, filed as application No. PCT/EP2009/001416 on Feb. 27, 2009, now abandoned.

(30) Foreign Application Priority Data

Feb. 27, 2008 (DE) .......................... 11 2008 011 405

(51) Int. Cl.
| | |
|---|---|
| *C09K 11/02* | (2006.01) |
| *F21K 2/00* | (2006.01) |
| *G09F 19/22* | (2006.01) |
| *G09F 13/20* | (2006.01) |

(52) U.S. Cl.
CPC . *F21K 2/00* (2013.01); *G09F 19/22* (2013.01); *G09F 13/20* (2013.01); *C09K 11/02* (2013.01)
USPC .......................................... 264/241

(58) Field of Classification Search
CPC . E04F 11/163; E04F 19/04; E04F 2019/0454; F21K 2/00; G08B 4/066
USPC .......................................... 264/241
See application file for complete search history.

(56) References Cited

U.S. PATENT DOCUMENTS

| | | | |
|---|---|---|---|
| 5,904,017 | A | 5/1999 | Glatz et al. |
| 7,074,345 | B2 | 7/2006 | Saito et al. |
| 2002/0015309 | A1 | 2/2002 | Stokes et al. |
| 2004/0137266 | A1 | 7/2004 | Saito et al. |
| 2005/0271879 | A1 | 12/2005 | Miura et al. |
| 2006/0162620 | A1 | 7/2006 | Horton, Jr. et al. |
| 2007/0031685 | A1 | 2/2007 | Ko et al. |

FOREIGN PATENT DOCUMENTS

| | | |
|---|---|---|
| CN | 1505674 | 6/2004 |
| DE | 19700310 | 7/1998 |
| DE | 69603186 | 2/2000 |
| DE | 69707508 | 5/2002 |
| DE | 20208172 | 1/2003 |
| EP | 0489561 | 10/1992 |
| JP | 2006-091466 | 4/2006 |
| RU | 2291052 | 1/2007 |
| WO | 9633093 | 10/1996 |
| WO | 0152224 | 7/2001 |

*Primary Examiner* — Jacob Thomas Minskey
(74) *Attorney, Agent, or Firm* — Vidas, Arrett & Steinkraus

(57) ABSTRACT

Escape route marking for an aircraft comprising photoluminescent pigments in a carrier material, which luminesce in the dark,
the carrier material comprising silicone and
the photoluminescent pigments having a mean particle size of less than 150 μm.

15 Claims, 3 Drawing Sheets

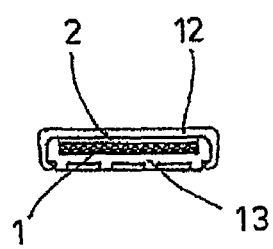
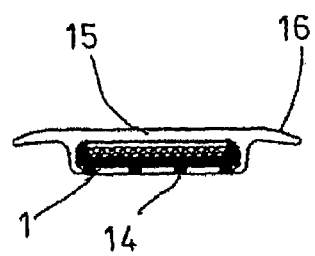
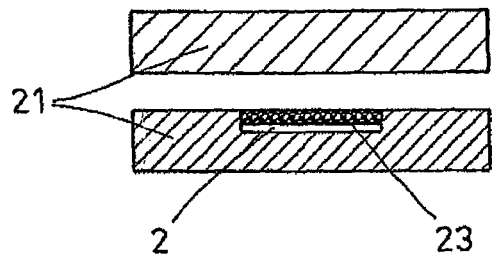
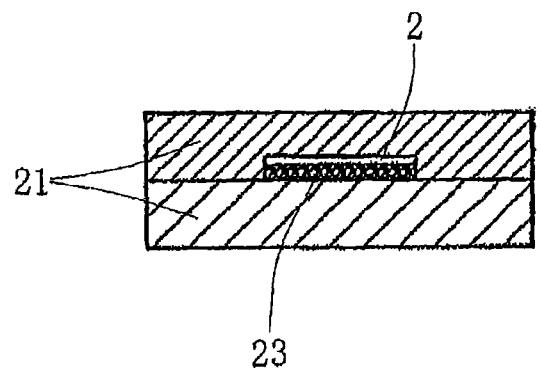
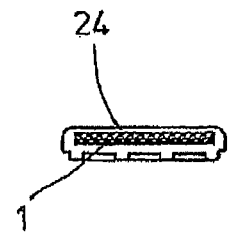

ESCAPE ROUTE MARKING FOR AN AIRCRAFT AND METHOD FOR PRODUCING AN ESCAPE ROUTE MARKING

CROSS-REFERENCE TO RELATED APPLICATIONS

This application is a Continuation of Ser. No. 12/919,518 filed Nov. 9, 2010, which is a U.S. National Stage of PCT/EP2009/001416 filed Feb. 27, 2009 which claims priority to DE 10 2008 011 405.7 filed Feb. 27, 2008, the entire contents of which are hereby incorporated herein by reference.

STATEMENT REGARDING FEDERALLY SPONSORED RESEARCH

Not applicable.

BACKGROUND OF THE INVENTION

The present invention relates to an escape route marking for an aircraft comprising photoluminescent pigments in a carrier material. The invention also relates to a method for producing an escape route marking for an aircraft.

It is known to arrange photoluminescent strips on the floor of the aircraft interior for marking escape routes in aircraft. Photoluminescence is occasionally also denoted as afterglow and/or phosphorescence. The safety requirements are specified, for example, in the German Industry Standard DIN 67510. The strips are laid on the floor of the aircraft cabin and indicate to the passengers and the crew in the event of an emergency the route to the exits and escape hatches. In the past, photoluminescent strips have increasingly become accepted as escape route marking when fitting-out aircraft and aircraft cabins, as said strips are reliable and may be operated without a power supply.

A permanently fluorescent layer is known from EP 0 489 561 A1, in which colour pigments are incorporated into a polymer matrix. In this case, the fluorescent material may be incorporated into a carrier which imparts different optical properties to the fluorescent light by additional filters.

An emergency lighting system for an aircraft is known from US 2002/015309 A1, in which photoluminescent material is arranged in a casing. The casing is held in a press fit engagement between two rails extending parallel to one another on the floor of the aircraft.

A photoluminescent material is known from U.S. Pat. No. 7,074,345 B2 which consists of a cured blend of a transparent base material and photoluminescent pigments. The viscosity of the base material is 1 Pa·s at 20° C. The photoluminescent pigments are added to the base material in a quantity of 7 to 95% by weight. A series of materials are proposed for the transparent base material. When using resins, it is proposed to use methyl methacrylate (MMA), PMMA, modified PMMA, unsaturated polyester resins, epoxy resins and silicone resins. Moreover, reference is made to the fact that olefin resins, such as for example polycarbonate resins and polypropylene resins could also be used. The disclosed photoluminescent material consists of a mixture of photoluminescent pigments which are mixed with further pigments. The further pigments have a mean particle size of 0.1 to 70 μm whilst the photoluminescent pigments have a mean particle size of 150 to 2000 μm.

BRIEF SUMMARY OF THE INVENTION

The technical object of the invention is to provide an escape route marking for an aircraft which may be provided with as little production cost as possible, the photoluminescent pigments thereof having a sufficient luminosity and at the same time being protected sufficiently against moisture and mechanical damage.

The escape route marking according to the invention for an aircraft has photoluminescent pigments incorporated in a carrier material, which luminesce in the dark. According to the invention, the carrier material is a silicone, which has photoluminescent pigments of a mean particle size of less than 150 μm. The escape route marking according to the invention is characterised by embedding photoluminescent pigments of a relatively small mean particle size into a silicone material. The invention is based on the recognition that the photoluminescent pigments are not damaged by the precipitated products of the silicones, such as for example acetic acid, and that the photoluminescent pigments are protected exceptionally well from outside by the cured silicone against liquid media. A separate encapsulation or other treatment of the photoluminescent pigments is not required for the silicone matrix so that this additional operation is dispensed with.

Preferably, the mean particle size of the photoluminescent pigments is less than 120 μm and particularly preferably less than 100 μm.

In a preferred embodiment of the escape route marking according to the invention, the silicone has a viscosity of $1 \times 10^4$ mPa·s or less, in particular less than 900 mPa·s (20° C.). The inventor has recognised that the viscosity of the silicone is important for the ability of the pigments to be incorporated and for easier processing of the silicone-pigment mixture. For the photoluminescent pigments provided according to the invention and with a small mean particle size it has been shown that the use of silicones of low viscosity permits particularly effective incorporation of the photoluminescent pigments and thus ensures that even in the cured silicone the pigments are uniformly distributed in the silicone matrix.

In a preferred embodiment, the carrier material is configured to be transparent or translucent. The silicones used as carrier material may be present both as single-component silicones and as multi-component silicones. They are preferably configured to be transparent. If the escape route marking is intended to luminesce in a different colour from that predetermined by the photoluminescent pigments, the carrier material may be coloured in a colour which is different from the colour of the photoluminescent pigments. As a result, there is the possibility of allowing the escape route marking to luminesce in a desired colour.

Preferably, the photoluminescent pigments comprise strontium aluminate. The use of strontium aluminate is, in particular, well-suited for use as escape route marking in aircraft, as these pigments have a sufficient brightness and sufficiently long persistence. Preferably, the weight component of the photoluminescent pigments is more than 35, preferably 60 to 70% by weight, of the blend consisting of silicone and pigments. In a preferred embodiment, the escape route marking exclusively has photoluminescent pigments which are distributed in the matrix of the cured carrier material.

The method according to the invention is used for producing an escape route marking for an aircraft, in which photoluminescent pigments are embedded in a carrier material. The photoluminescent pigments have a mean particle size of less than 150 μm and are incorporated therein before processing the carrier material. In the method according to the invention, preferably silicone is provided as a carrier material. The production method is characterised by the particularly simple step that the photoluminescent pigments, relative to otherwise conventional photoluminescent pigments with a small mean particle size, are incorporated into a silicone as carrier material. Costly method steps which protect the pigments for the arrangement in the matrix of the carrier material may be dispensed with. The relatively small mean particle size also makes it possible for the photoluminescent pigments to be able to be easily mixed with the silicone which is not yet cured. In preferred developments of the method according to the invention, the photoluminescent pigments have a mean particle size of less than 120 µm and particularly preferably of less than 100 µm.

In a preferred development of the method according to the invention, the mixture of silicone and photoluminescent pigments is capable of being cast after mixing. Preferably, the escape route marking may be cast, the escape route marking being cast with a thickness of 0.25 mm to 5 mm, preferably 0.15 mm to 7 mm.

For processing, the silicone-pigment mixture which is capable of being cast may, for example, also be applied directly at the point of application using spray guns. As a result, there is the possibility of filling up individual gaps between markings, and specifically attaching and/or enlarging escape route marking in places which are difficult to access. In addition to the casting method it is also possible to use suitable silicones which permit extrusion. In this case, the escape route marking may be extruded from the mixture of photoluminescent pigments and silicone. In a further preferred embodiment, it is possible that after emerging from the extruder, before or after calibration, the extruded strand may be spread with pigments or pigments may be rolled into said extruded strand. As a result, the extruded strand is additionally provided with photoluminescent pigments.

In a preferred development of the method according to the invention, the mixture of silicone and photoluminescent pigments is bonded, during or after curing, to a plastics layer. The plastics layer may be provided as a cover for the escape route marking or may be configured as a substrate for said escape route marking.

With suitable surface treatment (for example the corona method, primer) and depending on the required mechanical properties, thermoplastics such as polycarbonate, polyethylene, polyamide, ABS or other or other thermosetting plastics, such as epoxy resins, polyester resins or acrylates may be used, for example, as material for the plastics layer.

If, for example, the mixture of silicone and photoluminescent pigments is further processed by casting, there is the possibility of a plastics strip being inserted into a casting mould, before said casting mould is loaded with the mixture. The plastics strip may, in this case, previously be subjected to a surface treatment, in order to ensure an improved bond of the silicone with the plastics strip. In this embodiment of the method, in a single method step both the escape route marking may be produced with the photoluminescent material and the bonding of the silicone may be achieved with a plastics strip.

If the mixture of silicone and photoluminescent pigments is extruded, there is also the possibility of extruding a further plastics material by coextrusion, in order to bond the silicone-pigment mixture in this manner to a further material.

If the plastics layer is used as step protection or general protection of the surface of the photoluminescent component from mechanical load, said plastics layer is preferably coloured and transparent or translucent. Thermoplastics are particularly well suited to this due to their capacity for extrusion and high degree of toughness. It has proved particularly advantageous in the aviation industry to use polycarbonate, as this is available as a highly transparent material and has excellent properties regarding the fire protection standards which are applicable in the aviation field.

The cured silicone-pigment mixture with a transparent or translucent coloured plastics layer may be completely or partially encased by casting or injection-moulding, as a further processing option. Thus, in particular, curved and/or arcuate components may be easily produced with surface protection from mechanical load. Thermoplastics are again suitable for this, primarily for the injection-moulding method, and thermosetting plastics primarily for the casting.

BRIEF DESCRIPTION OF THE SEVERAL VIEWS OF THE DRAWINGS

The invention is described in more detail hereinafter in an exemplary embodiment in which:

FIG. 6 shows an elongate strip for the escape route marking which is arranged in a two-piece casing, FIG. 7 shows an elongate strip for the escape route marking in cross section which is protected by a cover, FIG. 8 shows in a schematic view a mould for the casting process of a planar strip for the escape route marking, FIG. 9 shows the mould of FIG. 8 during the curing process, FIG. 10 shows an elongate strip for the escape route marking which is embedded in a completely enclosed casing.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
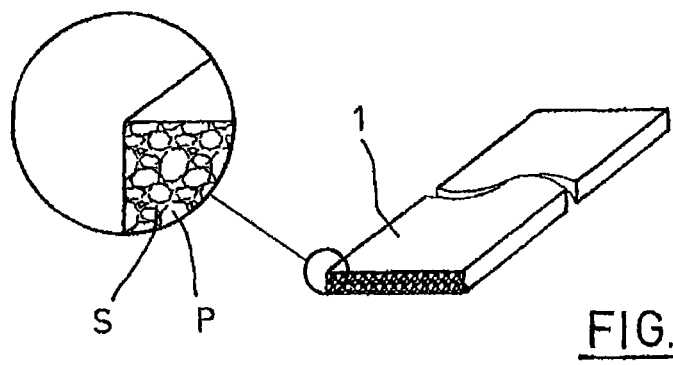
FIG. 1 shows a strip extended in an elongate manner for the escape route marking.

FIG. 1 shows an elongate strip 1 made of luminescent material which consists of photoluminescent pigments P, which are embedded in a cured silicone matrix. The detailed view of FIG. 1 shows individual photoluminescent pigments P which are embedded in the silicone matrix S. Instead of the linear shape shown, curved embodiments of the escape route marking may also be produced, in particular by means of casting or injection-moulding.

Figures 2, 3:
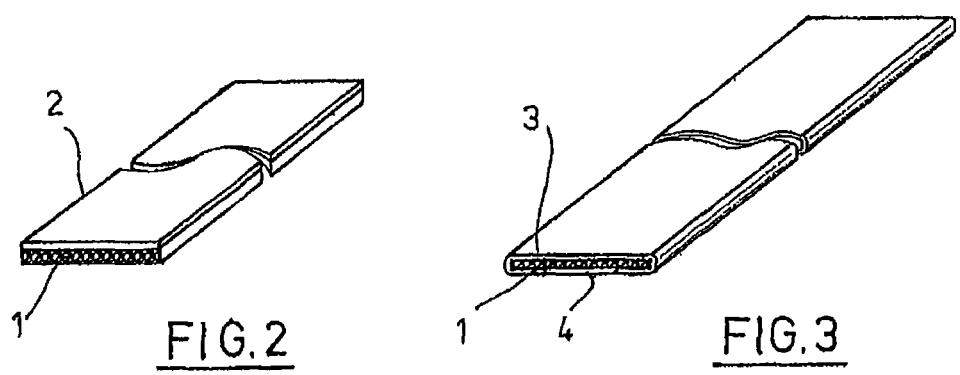
FIG. 2 shows an elongate strip for the escape route marking which is provided with a transparent plastics layer.
FIG. 3 shows an elongate strip for the escape route marking which is arranged in an enclosed, one-piece casing.

FIG. 2 shows a luminescent strip 1, as also shown in FIG. 1, which is fastened to a one-piece cover strip 2 made of plastics material for protection against mechanical loads. The cover strip is configured to be transparent or partially coloured. The carrier material is either bonded to the cover or produced together with said cover, as is explained further below.

FIG. 3 shows a luminescent strip 1 which is inserted into a one-piece casing 3 which is not completely enclosed, for protection against mechanical load. The casing 3 may be transparent or partially coloured. For fastening the escape route marking an adhesive layer 4 is provided on the underside, with which the escape route marking may be bonded, for example, to the floor of the aircraft cabin.

Figures 4, 5:
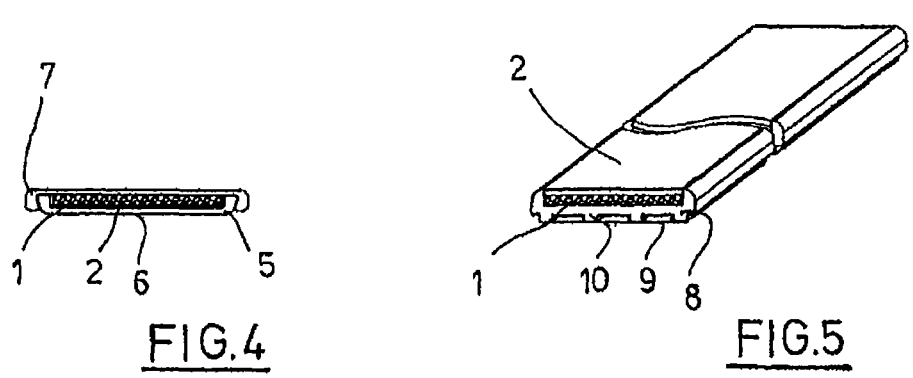
FIG. 4 shows an elongate strip for the escape route marking which is arranged in a two-piece casing.
FIG. 5 shows an elongate strip for the escape route marking in cross section, which is arranged in a semi-open plastics profile.

FIG. 4 shows an escape route marking in a two-piece casing 5, 7, the parts thereof encompassing one another on their outer edge. For improving the luminosity in the lower part of the casing 5 a reflective layer 6 is provided which reflects the incident light of the photoluminescent pigments, and thus increases the quantity of light emerging from the cover 7.

FIG. 5 shows a luminescent strip 1 which is provided with a cover 2. The strip 1 is received in a trough-shaped plastics profile 8, the strip being able to be bonded or simply inserted in the plastics profile 8. The plastics profile 8 has on its underside an adhesive layer 9, with which it may be bonded in the aircraft cabin. The profile 8 also has on its underside projections 10 extending in the longitudinal direction which serve for saving weight and receiving terminating elements which may be affixed for the top and bottom end.

FIG. 6 shows a luminescent strip 1 which is arranged in a plastics profile 13. The plastics profile 13 is additionally covered by a transparent plastics cover 12, in order to protect the strip 1 in this manner from mechanical damage and, if required, to be able to hold a colour filter film. Also, the strip 1 shown in FIG. 2 may be arranged with the cover strip 2 in the plastics profile 13.

FIG. 7 shows an embodiment in which the strip 1 is arranged in an upwardly open profile 14, the cover 15 thereof having wings 16 protruding on both sides, which project in their width over the profile 14. The wings 16 make it possible to attach the escape route marking in an improved manner to adjacent floor coverings.

FIGS. 8 and 9 show in a schematic view the production of a luminescent strip for the escape route marking as shown in FIG. 2. FIG. 8 shows schematically a mould 21 into which the transparent plastics strip 20 is already inserted. The silicone-pigment mixture is cast into the recess of the lower casting mould 21. In a subsequent step, for the curing process, the mould is rotated so that the cover 2 is no longer located at the bottom but at the top. As a result, during the curing a separation of the pigments and silicone is achieved which leads to an improvement of the luminosity.

After the curing of the silicone, the mould 21 may be opened and the cured strip removed with its cover 2.

FIG. 10 shows an embodiment of an illuminated strip of the same geometry as shown in FIG. 5, in which the cured silicone-pigment mixture 1 is embedded in a one-piece, completely enclosed casing 24. The casing may be produced in an injection-moulding or casting method and may also be designed to be partially open, for example to be able to provide support around the strip 1 during the casting.

Figure 11:
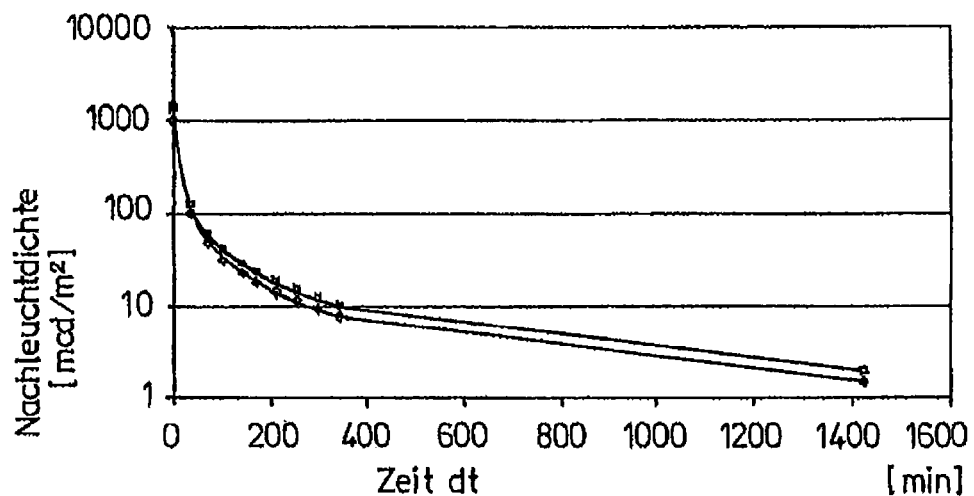
FIG. 11 shows a comparative measurement for an escape route marking according to the invention with a conventional escape route marking and FIG. 12 shows the relative increase in afterglow density in the comparative measurement of FIG. 11.
Figure 12:
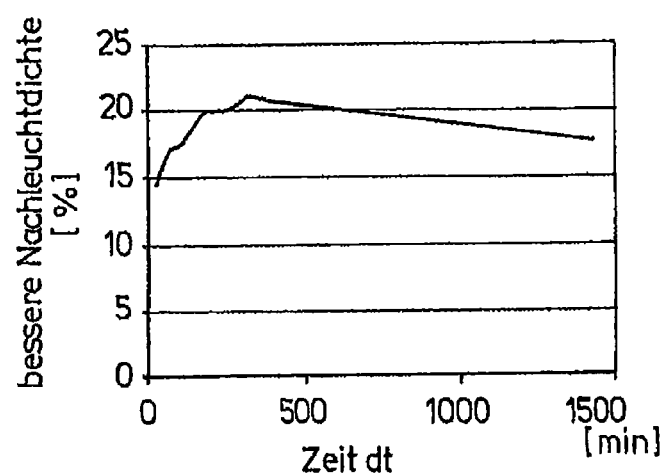

FIGS. 11 and 12 show the afterglow density of the escape route marking according to the invention in comparison with a conventional escape route marking. In the comparison, an escape route marking has been used of which the silicone-pigment mixture has a pigment component of 70% by weight, and which is cast onto a transparent polycarbobatfolie film pretreated with a primer. With a layer thickness of 1.2 mm, said escape route marking is compared with a conventional escape route marking, the thickness thereof also being 1.2 mm. In the diagram of FIG. 11, the afterglow density is plotted in mcd/m$^2$ over the time in minutes. The measurement of the escape route marking according to the invention is thus shown by squares whilst the afterglow density of the conventional component is shown by rhombuses. It may be seen clearly that the afterglow density in the escape route marking according to the invention is always greater than the afterglow density of the conventional escape route marking. For the purposes of the measurement, both escape route markings have been previously subjected to the same charge and have the same geometric dimensions. FIG. 12 illustrates once again the improvement of the escape route marking according to the invention by representing the relative improvement of the afterglow density. It may be clearly seen in the diagram of FIG. 12 that the afterglow density is always better by at least 15% than in the conventional escape route marking. In the particularly relevant time interval of 200-600 minutes the afterglow density is actually at least 20% better.

Not shown in the figures is an embodiment of the invention in which the silicone-pigment mixture is applied through a nozzle and thus may be applied into a joint or onto a curved or angular region. As a result, there is also the possibility of marking narrow spaces with the escape route marking.

In one example, a luminescent strip is produced in the casting method with a highly-transparent two-component silicone. The silicone has a viscosity of approximately 800 m Pa·s at 20° C. before admixing the photoluminescent pigments. The pigments are again based on strontium aluminate and have a mean particle size of approximately 50 μm. The weight component of the pigments in the finished silicone-pigment mixture is approximately 60% by weight.

Even with a thickness of 1.5 mm a sufficient afterglow density could be achieved, as is used in the current prior art for the aviation field. The high afterglow density combined with the low thickness of the escape route marking makes it possible to incorporate it particularly easily in cabin surfaces made of carpet or rubber mats. Extensive salt spray tests for more than 1000 h have resulted in a markedly higher resistance of the pigments embedded in the silicone matrix than in conventional escape route markings.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Method for producing an escape route marking for an aircraft, the method comprising the steps of:
   providing photoluminescent pigments having a mean particle size of less than 120 μm,
   providing silicone having a viscosity of less than 10 Pa·s (20° C.) as a carrier material,
   mixing said silicone and said photoluminescent pigments such that the mixture is castable after mixing, the mixture comprising more than 35% by weight of said photoluminescent pigments; and
   casting said mixture to make said escape route marking for an aircraft, wherein the photoluminescent brightness of the composition does not fall below 0.5 mcd/m$^2$ for a period of up to 15 hours when charged for 30 minutes at 50 Lux.

2. Method according to claim 1, characterised in that the mean particle size is less than 100 μm.

3. Method according to claim 1, characterised in that the escape route marking is cast in a thickness of 0.15 mm to 7 mm.

4. Method according to claim 3, characterised in that the escape route markings is cast in a thickness of 0.25 mm to 5 mm.

5. Method according to claim 1, characterised in that the escape route marking is extruded from the mixture of photoluminescent pigments and silicone.

6. Method according to claim 5, characterised in that, after emerging from the extruder, the extruded strand is additionally provided with pigments.

7. Method according to claim 1, characterised in that the mixture of silicone and photoluminescent pigments is bonded during processing to a plastics layer.

8. Method according to claim 7, characterised in that a transparent plastics strip is inserted into a casting mould and subsequently the casting mould is loaded with the mixture of silicone and photoluminescent pigments.

9. Method according to claim 1, characterised in that the mixture of silicone and photoluminescent pigments is coextruded with a further plastics material.

10. Method according to claim 9, characterised in that the further plastics material forms a cover for the escape route marking.

11. Method according to claim 1, characterised in that a further plastics material is partially or completely cast around the cured carrier material.

12. Method according to claim 11, characterised in that the further plastics material is cast in an injection-moulding process around the carrier material.

13. Method according to claim 11, characterised in that the further plastics material is cast in the casting mould around the carrier material.

14. Method for producing an escape route marking for an aircraft comprising strontium aluminate based photoluminescent pigments, which are embedded in a carrier material, characterised in that the photoluminescent pigments have a mean particle size of less than 120 μm and are incorporated therein before processing the carrier material, silicone being provided as a carrier material with a viscosity of less than 10 Pa·s (20° C.), the mixture of silicone and photoluminescent pigments being capable of being cast after mixing.

15. Method for producing an escape route marking for an aircraft, the method comprising the steps of:
    providing photoluminescent pigments having a mean particle size of less than 120 μm,
    providing silicone having a viscosity of less than 10 Pa·s (20° C.) as a carrier material,
    mixing said silicone and said photoluminescent pigments such that the mixture is castable after mixing, the mixture comprises more than 35% by weight of said photoluminescent pigments, and
    extruding said mixture of photoluminescent pigments and silicone into a strand; and
    additionally providing said extruded strand with said photoluminescent pigments after emerging from the extruded, the extruded strand is additionally provided with pigments; and
    casting said mixture to make said escape route marking for an aircraft, wherein the photoluminescent brightness of the composition does not fall below 0.5 mcd/m$^2$ for a period of up to 15 hours when charged for 30 minutes at 50 Lux.

* * * * *